May 8, 1962 P. A. LEPELLETIER 3,033,324
VEHICLE BRAKE CONTROL AND BALANCING SYSTEM
Filed March 4, 1957 6 Sheets-Sheet 1

Fig. 1

May 8, 1962 P. A. LEPELLETIER 3,033,324
VEHICLE BRAKE CONTROL AND BALANCING SYSTEM
Filed March 4, 1957 6 Sheets-Sheet 3

United States Patent Office 3,033,324
Patented May 8, 1962

3,033,324
VEHICLE BRAKE CONTROL AND BALANCING SYSTEM
Pierre André Lepelletier, Chatou, France, assignor to Societe Anonyme Francaise du Ferodo, Paris, France, a corporation of France
Filed Mar. 4, 1957, Ser. No. 643,735
Claims priority, application France Mar. 8, 1956
8 Claims. (Cl. 188—152)

It is well known that the brake controls of the usual standard type for automobile vehicles comprise a hydraulic circuit which actuates the friction surfaces of the brakes, while the reactions are absorbed by fixed points.

Instead of these fixed points, it has also been proposed to absorb the reactions by movable points between which, for two or more brakes, a coupling is applied through a distributing device, such that the coupling itself ensures the balancing of the reactions.

The invention relates to a control system of this latter type and in the description which follows, there is indicated by "primary" the hydraulic actuating circuit and by "secondary" the reaction-balancing device. This device may have any suitable form, mechanical or other, selected in accordance with the optimum conditions or applications in each particular case, but which generally consist, although not exclusively, like the primary circuit, of a hydraulic circuit.

One object of the invention is to obtain an improved balancing of the brakes with an increased margin of safety, especially by the provision of continuous refilling of the circuits. A further object is to permit of the retention of an adequate balance in the case of a rupture of the circuit. A further object is to fulfil these conditions by means of an operating pump which is of simple and compact construction.

In accordance with the invention, the primary circuit is divided into a number of sections each of which goes to a brake and applies a braking pressure thereto. The primary sections, during at least one phase of the braking period are made hydraulically independent of each other, while means are provided to cause these sections to communicate with each other and are sensitive to at least one well-defined condition of the control system, for example to a condition of rest.

During the braking phase in which the sections of the primary are hydraulically separate from each other, the forces developed by these sections have no relation directly imposed therebetween and thus can be harmoniously adapted to the balancing of the reactions imposed by the secondary. Outside this phase however, and especially at rest, the reestablishment of a hydraulic communication between the sections of the primary makes it possible to take various important measures in view of effective operation, amongst which there is more particularly provided in accordance with the invention: the continuous refilling of the circuits, the purging of air, the advantageous development of two successive different kinds of balancing, safety ensured by the primary in case of failure of the secondary, etc.

In an application of the invention to a braking control system with a hydraulic secondary, means of communication are provided between the secondary circuit and a recharging source and are governed by the condition of the brake pedal, so as to be active both at rest and at the beginning of each depression of the said pedal, and to be inactive during the period of further depression of the pedal. This source has preferably a pressure which depends on the condition of rest or of depression of the pedal, so as to compensate for the variations in capacity or possible leakages in the secondary circuit, on the one hand at rest by means of a continuous communication with a reservoir under static load, and on the other hand at every operation of the pedal under the effect of the forced circulation which is thereby produced in the circuits.

In accordance with a still further feature of the invention, means of communication or of separation of the sections of the primary are made sensitive to the pressure of the secondary circuit so as to obtain a transition in the operation of the primary when this secondary pressure exceeds a predetermined value.

In one form of embodiment, the transition pressure is chosen to be substantially zero in order that a primary balancing of the usual type may be reserved only in case of failure of the secondary. In an alternative form, the transition pressure is fixed at a higher value in order to defer, in addition, a separation of the primary sections to a more accentuated phase of the braking.

Other objects, special features and advantages of the invention will furthermore also be brought out in the description which follows below, of forms of embodiment chosen by way of example, reference being made to the accompanying drawings, in which.

Figure 1:
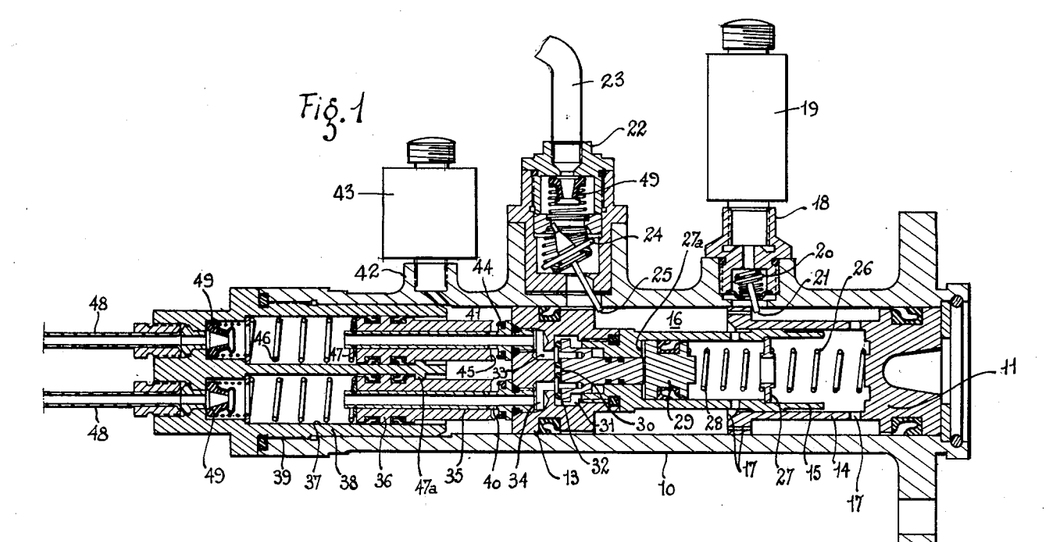
FIG. 1 is a view in longitudinal cross-section of a control pump in accordance with the invention, in which the transition pressure is chosen to be substantially zero.
Figure 2:
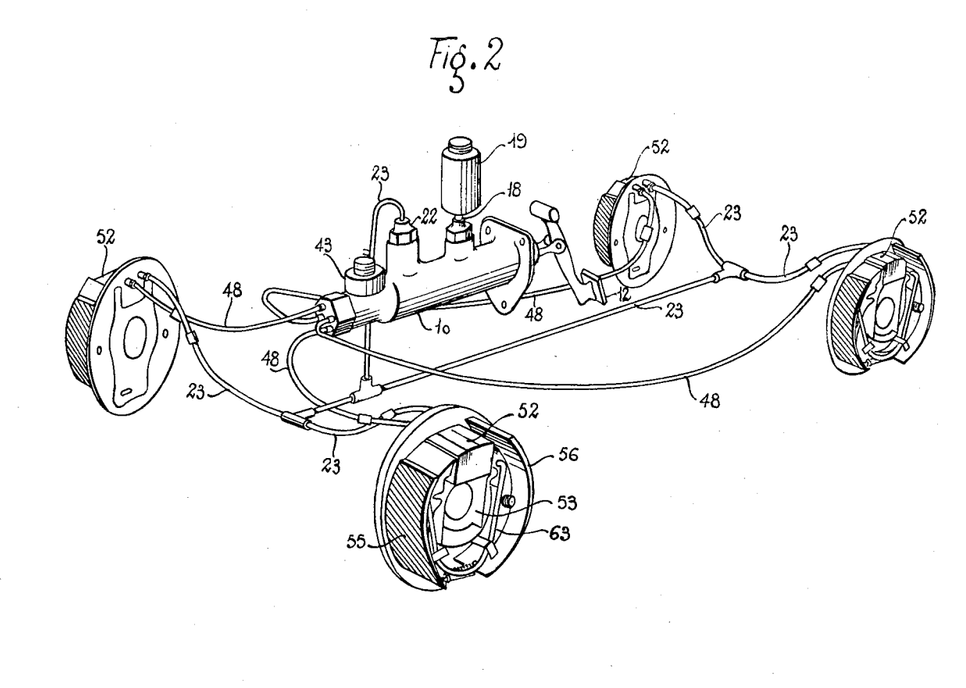
FIG. 2 is a diagram of the hydraulic circuits.
Figure 3:
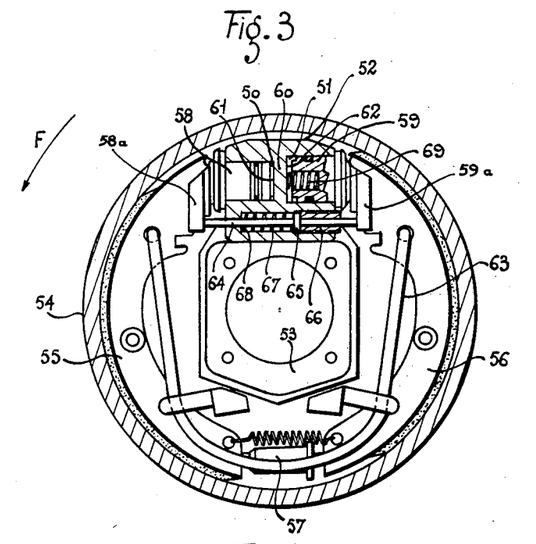
FIG. 3 is a view of a brake.

Reference will first of all be made to FIGS. 1 to 3. The pump or master-cylinder 10 which controls the braking (see FIG. 1) comprises a sliding piston 11, the movements of which are controlled by the brake-pedal 12. In the cylinder 10 a further piston 13 is also arranged to slide. The rods 14 and 15 of the pistons 11 and 13 are hollow, one being turned towards the other with the second engaged in the first, with a view to improving the centering of the assembly. The chamber 16 of the cylinder 10 comprised between the pistons 11 and 13 is filled with oil and comprises various communication passages, such as 17, in order to ensure the same pressure everywhere, that is to say both in the interior and at the exterior of both the hollow rods 14 and 15.

The chamber 16 is coupled at 18 to a reservoir 19 of oil by means of a non-return valve 20 of a type known per se, the tail 21 of which co-operates with the piston 11. When the piston 11 is in the position of rest, it causes the tail 21 to swing and the oil can circulate in both directions through the valve 20. As soon as the piston 11 is depressed, it frees the tail 21 and the valve 20 enables a circulation of oil to take place in the direction of chamber 16 to conduit 23, but prevents any flow in the reverse direction.

The chamber 16 is coupled in addition at 22 to a conduit 23 through the medium of a non-return valve 24, the tail 25 of which co-operates with the piston 13. When the piston 13 is in the position of rest, it causes the tail 25 to swing and the oil can circulate in both directions through the valve 24. When the piston 13 is urged towards the left-hand side of FIG. 1, it frees the tail 25 and the valve 24 enables a circulation of oil to take place in the direction of chamber 16 to conduit 23, but prevents any flow in the opposite direction.

A spring 26 acts between the piston 11 and an abutment 27 of the rod 15 of the piston 13, whilst a spring 28 acts between the abutment 27 and a small piston 29 which is slidably mounted inside the piston 13. In certain cases, the two springs 26 and 28 may be replaced by a single spring.

The small piston 29 which may be provided in several parts, as shown, with a view to the assembly in the base 27a of the rod 15 has one extremity 30 which works in an intercommunication chamber 31 formed in the piston 13. This extremity 30 is provided with valve seats 32 intended to close the openings 33 into the chamber 31, of four passages 34 formed in the piston 13. These passages 34 are respectively coupled to tubular end portions 35 fixed to the piston 13. A piston 36 is slidably mounted on each end portion 35 and is guided within the interior of a bore 37. The four bores 37 corresponding to the four end portions 35 are formed in a single piece 38 which is screwed at 39 on the extremity of the cylinder 10.

In the vicinity of the piston 13, each tubular end portion 35 comprises one or a plurality of orifices 40 intended to cause the interior of the end portion to communicate with a chamber 41 which surrounds the end portions 35 and is comprised in the cylinder 10 and in the member 38, between the piston 13 and the pistons 36. The chamber 41 is coupled at 42 with a reservoir 43. A valve seat 44 is mounted on each end portion 35 in the vicinity of the orifices 40 and co-operates with the extremity 45 of the rod of the piston 36, with a view to closing the orifices 40. The piston 36 is mounted so as to be movable along the end portion 35 between a stop position at 47a in which the orifices 40 are uncovered and a stop position at 44 at which the orifices 40 are closed. It tends to be returned to this second position by a spring 46 engaged between it and the bottom of the bore 37. However, in the position of rest, as shown in FIG. 1, an abutment 47a projecting into the bores 37 retains the pistons 36 against the action of the springs 46 so that the orifices 40 are uncovered.

The four bores 37 are coupled to four conduits 48. Residual pressure valves 49 of a type known per se are provided both at the coupling of the conduits 48 and at the coupling of the conduit 23, in order to permit the passage of oil in both directions, this passage being free in the direction which leads towards the conduit and being made against the action of a weak spring in the opposite direction.

The four conduits 48 leading from the pump 10 (see FIG. 2) are parts of the primary braking circuit and are coupled to the primary chambers 50 (see FIG. 3) of brake cylinders 52. The conduit 23 leading from the pump 10 forms part of the secondary braking circuit and is coupled to the secondary chambers 51 of the cylinders 52. The arrangement of the brakes and of the brake-cylinders is such that the balancing of the braking action is determined in a preponderant manner during forward running in the direction of the arrow F by the secondary circuit with respect to the primary circuit.

An example of an arrangement of brake is shown in FIG. 3, to which reference will be more particularly made. There is seen at 53 of FIG. 3 a plate or fixed brake backing plate and at 54 a drum rotating in the direction F for forward running. Two shoes 55 and 56 follow each other in the interior of the drum 54 and are coupled to each other by a connecting rod 57. The shoe 55 is actuated by a piston 58 which moves in the primary chamber 50 of the cylinder 52.

The other shoe 56 is received on a piston 59 which moves in the secondary chamber 51 of the cylinder 52. There can be seen at 60 the central partition which forms the bottom 61 of the primary chamber 50 in the cylinder 52 and the bottom 62 of the secondary chamber 51. A U-shaped restoring spring 63 couples the two shoes 55 and 56, whilst a centering device is provided to bring these two shoes back into a definite position of rest in which the secondary chamber 51 retains an appreciable reserve of oil. This centering device comprises a rod 64 passing through the body of the cylinder 52 and arranged between two projections 58a and 59a of the pistons 58 and 59 in order to give a lower limit to the relative distance between these two pistons. The rod 64 comprises a collar 65 which abuts against a nut 66 screwed in an adjustable manner in the cylinder body 52. A return spring 67 is arranged between the collar 65 and a bearing surface 68 of the body 52, while a spring 69 maintains the piston 59 in contact with the shoe 56 in the position of rest.

When the pedal 12 is depressed with the object of braking, the piston 11 begins by freeing the tail 21 of the supply valve 20. As the valve 20 is closed, the movement of the piston 11 drives the oil through the circuit 23 at the same time pushing forward the piston 13. This latter movement first of all closes the orifices 40 by applying the valve seat 44 against the extremities 45, which makes the four primary conduits 48 independent, since the openings 33 are closed at 32 by the piston 29 under the action of the spring 28. The piston 13 pushes forward the pistons 36 and then forces the oil into the four conduits 48, while it partly frees the tail 25 of the valve 24. The pressure increases simultaneously at 48 and at 16; the arrangement is such that the pressure at 16, added to the action of the spring 28, constantly maintains the orifices 33 completely closed.

The four brakes are subjected to a movement of expansion at the same time by the primary chambers 50 and by the secondary chambers 51, the primary pistons 58 having equal or proportional displacements, thus ensuring a positive hydraulic coupling between the piston 13 and each of the pistons 58, and an effective re-filling of the primary chambers 50.

During forward running, at the moment when the shoes 55 and 56 come into contact with the drums 54, the greatest reaction is developed on the secondary side. The shoes 55 and 56 begin a movement of rotation in the direction of running. The oil is driven back towards the pump 10 by the secondary circuit 23, while a similar intake of oil is produced in the independent circuits 48.

The piston 13 accompanies this movement by completing the liberation of the tail 25 of the valve 24. The latter closes abruptly under the pressure of the circuit 23, which assumes a value very much greater than that of the chamber 16. At the same time, the volume of oil from this chamber 16 is fixed at a constant value which ensures a rigid coupling of the two pistons 11 and 13.

As the depression of the pedal 12 continues its movement, the braking effect increases with a predominant balancing by the secondary circuit. When the pedal 12 is released, the whole of the device returns to the position of rest.

When running in reverse, at the moment when the shoes 55 and 56 come into contact with the drums 54, the greatest reaction is developed on the primary side. The jaws 55 and 56 begin a movement of rotation in the direction opposite to that of the arrow F. The oil is driven back towards the pump 10 through the independent circuits 48, whilst an intake of oil is produced through the secondary circuit 23.

The piston 13 accompanies this movement by a backward movement until the primary pistons 58 come into abutment against the bottoms 61 of the chambers 50. The piston 13 then becomes stationary in a position in which it swings the tail 25 and in which the valve 24 is thus kept slightly open.

As the depression of the pedal 12 is continued, the oil from the chamber 16 is forced through the circuit 23 into the brakes, the balancing of which becomes standard.

If it accidentally occurred that one of the conduits 48 became broken, the corresponding brake would then be supplied only through the secondary circuit 23 and its chamber 51, through the medium of the three other brakes. During forward running, the latter carry out a small additional movement of rotation in the direction of running, reducing the reserve of their secondary chamber 51, and slightly increasing the travel of the pedal 12. During running in reverse, no change is to be observed.

If it occurred accidentally that the secondary circuit 23 became broken, none of the brakes would be any longer supplied by the chambers 51. The piston 11 comes into mechanical abutment against the rod 15, and the assembly 11—13 drives the oil into the conduit 48 until the shoes 55 and 56 come into contact with the drum 54, applying the pistons 59 against the bottoms 62. As the movement of depression of the pedal 12 continues, since the effect of the pressure applied in the conduits 48 overcomes the effect of the pressure in the chamber 16 and the spring 28, the piston 29 is pushed back towards the righthand side of FIG. 1 and frees the opening 33 of the passages 34, so that the conduits 48 communicate with each other through the chamber 31.

A balancing effect of the usual type is thus kept in reserve. During forward running, the braking power is the same as before the rupture of the secondary circuit 23, whilst during reverse running the braking power is reduced, by reason of the fact that the brakes are then actuated as self-releasing.

During normal working, it is to be noted that the secondary circuit communicates with a re-filling source 16—19, and that this communication is operative while at rest and at the beginning of each depression of the brake pedal 12, but is interrupted at 24 during the course of the downward movement of the pedal. This source 16 has a pressure which depends on the condition of rest or of the depression of the pedal 12, so as to compensate for the variations of capacity or the possible leakages in the secondary circuit 23, on the one hand at rest by a continuous communication with a reservoir 19 under a suitable level of oil, and on the other hand at every actuation of the pedal 12, under the effect of the forced circulation which results therefrom, out of the chamber 16.

Figure 4:
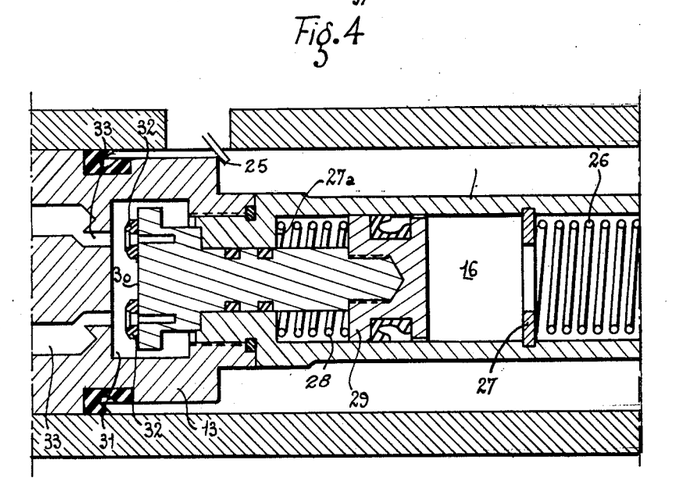
FIG. 4 is a partial view, to a larger scale, of an alternative form of FIG. 1, in which the transition pressure instead of being substantially zero is fixed at a higher value.

Reference will now be made to FIG. 4 in which is shown a modified part of the pump of FIG. 1, and in which the transition pressure which causes the separation of the primary conduits 48, instead of being substantially zero is fixed at a higher value. In FIG. 4, there will be recognized at 13 the piston in which is formed the intercommunication chamber 31, at 15 the rod of this piston with its bottom 27a, and at 29 the small piston which is slidably mounted inside the rod 15 and is associated with the chamber 31 so as to make this latter inactive or active. But in this case, the spring 28, instead of being mounted between the piston 29 and the washer 27, is mounted between the piston 29 and the bottom 27a, which means that it now acts in the opposite sense by tending to make the chamber 31 not inactive but active.

At rest, the chamber 31 establishes the communication between the primary sections 48, parallel with the orifices 40, but whilst the latter become closed as soon as the piston 13 is depressed, it maintains the communication between the primary sections 48 until the pressure which increases in the chamber 16 overcomes the resistance offered by the spring 28 and the pressure developed at 48 and 31. This arrangement enables the isolation of the primary conduits 48 to be deferred until a more accentuated phase of the braking operation, and enables differentiated effects of balancing to be obtained during the course of development of the braking action. The calibration of the spring 28 enables the point of transition to be selected at will with a view to an optimum operation in each particular case.

Of course, as in the case of FIG. 1, and to a greater extent since the spring 28 acts this time in the direction which tends to make the chamber 31 active, the primary balancing is kept in reserve in case of a fault occurring on the secondary.

Figure 5:
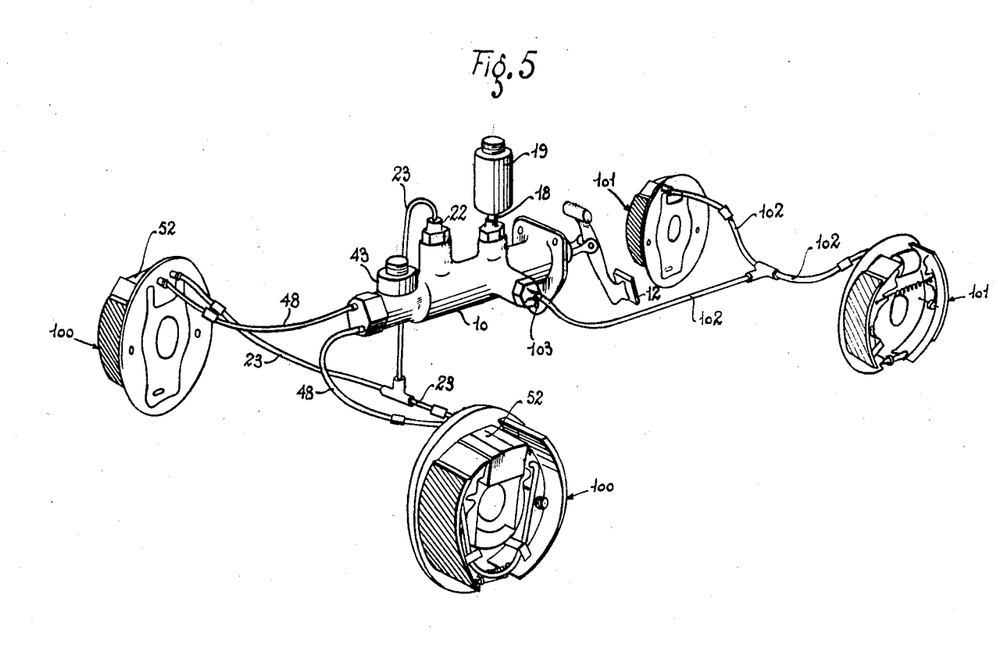
FIG. 5 is a diagram similar to that of FIG. 2 but relating to an alternative form of circuit.

Reference will now be made to FIG. 5, in which the arrangement is similar to that of FIG. 2 but is applied only to the front brakes 100, whilst the rear brakes 101 are of a standard type. The secondary circuit 23 is associated only with the front brakes 100 which are supplied on the primary side through two conduits 48, the pump 10 being provided with two bores 37 instead of four. The rear brakes 101 are supplied on the primary side by a circuit 102 coupled at 103 to the chamber 16 of the pump 10.

Figures 6, 6A:
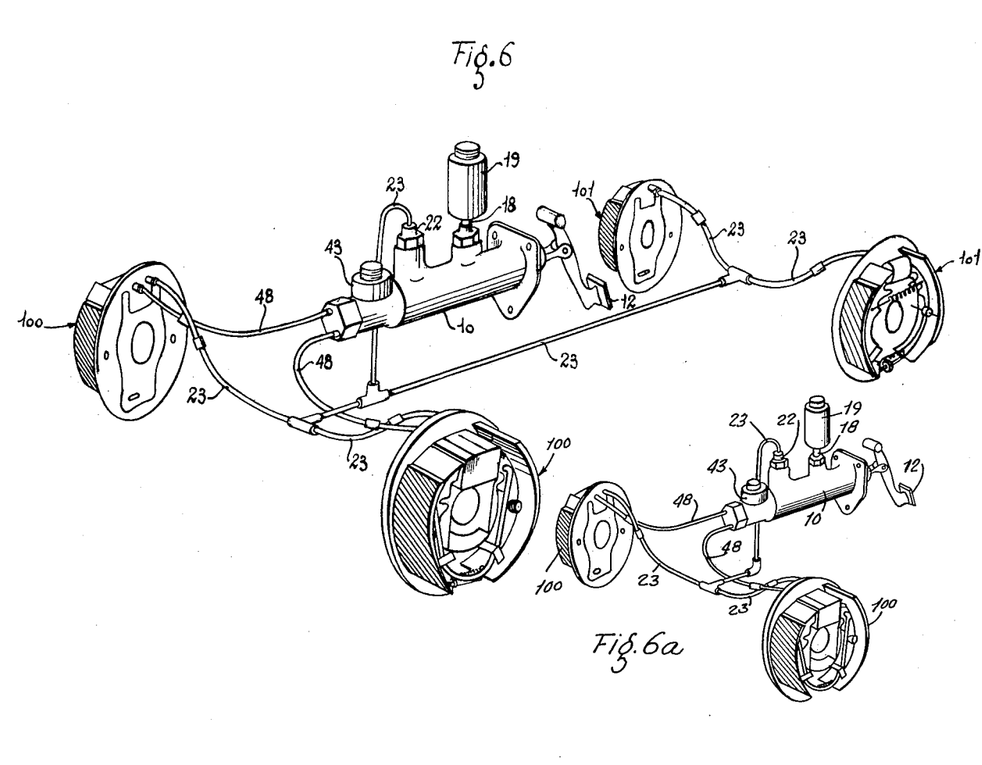
FIGS. 6 and 6a relate to further alternative forms of circuits.

In an alternative form shown in FIG. 6, the rear brakes 101 instead of being supplied on the primary side from the chamber 16 are supplied on the secondary side through the secondary circuit 23. They are actuated taking account of a slight additional movement of rotation of the front brakes 100.

In a further alternative form shown in FIG. 6a the arrangement is similar to that of FIG. 2 or FIG. 5 or FIG. 6, but the front brakes 100 are controlled according to the invention while the rear brakes if any (not shown) have any suitable control such as that of FIG. 5 or of FIG. 6 or other types.

Figure 7:
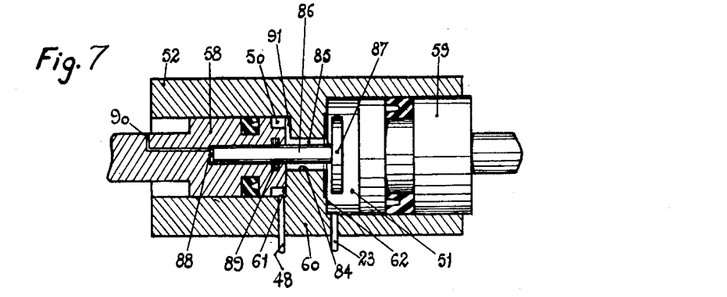
FIG. 7 is a view of a cylinder incorporating means for re-filling the circuit.
Figure 7A:
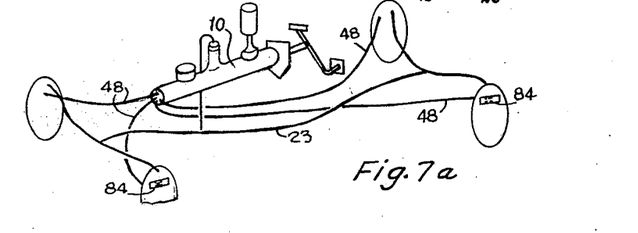
FIG. 7a shows schematically a system including the cylinder of FIG. 7.
Figure 8:
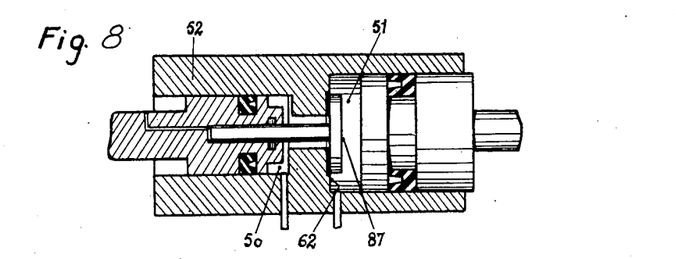
FIGS. 8 and 9 are views of this cylinder in different positions of operation.
Figure 9:
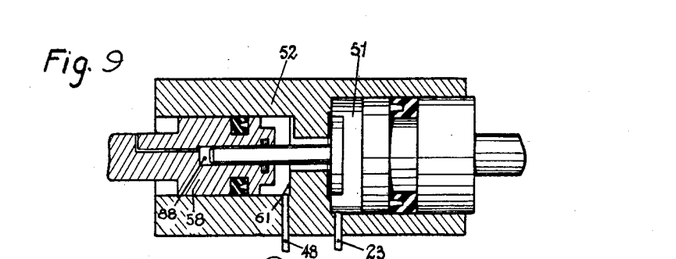

In the various forms of embodiment which have been described up to this point, the re-charging of the secondary circuit 23 is effected at the level of the master-cylinder 10. Reference will now be made to FIGS. 7 to 9, in which this re-charging is effected at the level of the double brake cylinders 52.

Each double brake cylinder 52 has a central partition 60 which is pierced at its centre at 84, between the bottom 61 of the chamber 50 and the bottom 62 of the chamber 51. In the hole 84 a rod 86 is engaged with a substantial annular clearance 85. On one extremity of the rod 86 is fixed a plate or enlarged head 87 which extends into the chamber 51 and which is intended to form a valve with the base 62. On the other hand, the rod 86 is engaged in a drilled hole 88 in the piston 58, with a sealing joint 89. The bottom of the hole 88 is connected to atmosphere at 90 in order to avoid any stray compressed air effect on the rod 86. A groove 91 is formed in the bottom 61 to provide a communication from the chamber 50 to the passage 85, even when the piston 58 is applied against the bottom 61 in the position of rest.

When the pedal 12 is released, the pistons 58 and 59 take up their respective positions of rest due to the action of the elastic restoring means of the shoes 55 and 56 (see FIG. 7).

In this position, the rod 86 is in abutment against the extremity 88 of the drilled passage, while the head 87 is spaced apart from the bottom 62. The chambers 50 and 51 are in communication through the passage 85, so that the balancing circuit 23 is then coupled to the conduits 48 and is supplied with oil from the same reservoir.

When pressure is applied to the pedal 12 to begin a braking action, the circuits 48 are put under pressure as is also the closed circuit 23. The return actions are then applied respectively to the pistons 58 and 59 and act in opposition to their movement under the effect of the pressure, the actions being set up in such manner that the piston 59 can only begin to move at a certain pressure by the choice of the diameters of the bores of the chambers 50 and 51, in order to obtain in each of these chambers the most appropriate rate of re-filling. In the example shown, the diameter of the chamber 51 is greater than the diameter of the chamber 50, but it could be equal to or less than this diameter.

As soon as the pressure in the chambers 50 and 51 reaches a value sufficient to move the piston 58, the latter moves towards the left together with the rod 86, until it takes up the position of FIG. 8, at which the head 87 is applied against the bottom 62.

Beyond this position, the piston 58 continues its travel alone (see FIG. 9) leaving the head 87 applied against the bottom 62 by the action of the difference of the cross-section subjected to the pressure. As soon as the braking is effective, the pressure rises in the chambers 50 and 51, and the higher pressure then existing in the chamber 51, added to the difference in cross-sections, maintains still more strongly the application of the head 87 against the bottom 62 and the perfect isolation of the chambers.

When the brakes are released, the head 87 remains applied against the bottom 62 up to the position shown in FIG. 8, and then moves away under the restoring action of the piston 58 up to the position shown in FIG. 7, this latter movement being made possible by the elimination of any substantial pressure from the chamber 51.

This arrangement ensures the automatic re-filling of the balancing circuit 23 by communication with the conduits 48. In particular, any depression produced in the circuit 23, and especially at the moment of release of braking, results in the automatic opening of the valve 87 and the return-flow of liquid advantageously assisted by the withdrawal of the piston 58. At the same time, complete safety is ensured at the moment of braking and in case of a rupture of the conduits 23, by forcing the closure in this event of the head 87 due to the direct pressure of the piston 59. In the same way, in case of a break in the conduit 48 coupled to the chamber 50, the section of the head 87 is sufficient to maintain the piston 58 in the position shown in FIG. 8.

What I claim is:

1. A vehicle brake operating system for a vehicle having a brake pedal comprising at least two brakes for two wheels of an axle of the vehicle respectively, each brake having a stationary back plate, a double cylinder means supported by the back plate and having a primary chamber and a secondary chamber filled with hydraulic fluid, a primary piston reciprocable in said primary chamber, a secondary piston reciprocable in said secondary chamber, a rotary brake drum, two brake shoes each operable to bear frictionally against the brake drum in response to the travel of said pistons in a direction for causing said shoes to bear on said drum, each shoe having an end applied against one end of said pistons respectively, interconnecting means disposed extending at a position opposite to the double cylinder means and interconnecting the opposite ends of said shoes, spacing means for the pistons defining a rest minimum distance therebetween, resilient restoring means applied between the shoes urging the pistons in rest minimum distance relation, positioning means for urging the spacing means in a definite rest position wherein a reserve of hydraulic fluid is provided at least in the secondary chamber, two primary conduits connected to the primary chambers of the two brakes respectively, control means responsive to actuation of the brake pedal for feeding equal volumes of hydraulic fluid in the two primary conduits respectively to cause the primary position in each brake to travel in a direction for causing the brake shoes to bear on the respective brake drum upon actuation of said pedal for braking the vehicle and a balancing secondary circuit interconnecting the two secondary chambers for freely allowing hydraulic fluid flow therebetween to apply fluid pressure to the pistons in said secondary chambers in response to the travel of the pistons in the primary chambers and in a direction for causing said pistons in said secondary chambers to apply said brake shoes to the respective drums and cause said brake shoes to apply balanced braking forces to said wheels.

2. A vehicle brake operating system as defined in claim 1, including valve means responsive to the pressure in the secondary circuit for isolating the two primary conduits from each other when said pressure is greater than a predetermined value and interconnects the two primary conduits with each other when said pressure is less than said value.

3. A vehicle brake operating system as defined in claim 1 in which said secondary circuit comprises a secondary conduit, a secondary reservoir, valve means between said secondary conduit and reservoir responsive to said control means for opening said valve means when said control means is released and for closing said valve means when said control means is actuated.

4. A vehicle brake operating system as defined in claim 1, further comprising other hydraulic brakes having cylinders filled with hydraulic fluid and responsive for engaging said other brakes upon pressurization of the fluid in said cylinders, and connecting means for connecting said secondary circuit with the cylinders of said other brakes.

5. A vehicle brake operating system for a vehicle having a brake pedal comprising at least two brakes for two wheels of an axle of the vehicle respectively, each brake having a stationary back plate, cylinder means supported by the back plate having a primary chamber and a secondary chamber filled with hydraulic fluid, a primary piston reciprocable in said primary chamber, a secondary piston reciprocable in said secondary chamber, a rotary brake drum, two brake shoes each operable to bear frictionally against the brake drum in response to the travel of said pistons in a direction for causing said shoes to bear on the drum, each shoe having one end applied against one end of said pistons, respectively, two primary conduits connected to the primary chambers of the two brakes respectively, control means actuated by said brake pedal for feeding equal volumes of hydraulic fluid in the two primary conduits respectively, to cause the primary piston in each brake to travel in a direction for causing the brake shoes to bear on the respective brake drum upon actuation of said pedal for braking the vehicle, and a balancing secondary circuit interconnecting the two secondary chambers freely allowing hydraulic fluid therebetween to apply fluid pressure to the pistons in said secondary chambers in response to the travel of the pistons in the primary chambers and in a direction for causing said pistons in said secondary chambers to apply said brake shoes to the respective drums and cause said brake shoes to apply balanced braking forces to said wheels.

6. A vehicle brake-operating system for a vehicle having a brake pedal comprising, at least two brakes for two wheels of an axle of the vehicle respectively, a master-cylinder, a slidable piston means in said master-cylinder actuated by said brake pedal, a general pressure chamber disposed forward said piston means, two individual cylinders in said master-cylinder adjacent to said general chamber, two individual pistons reciprocable in said individual cylinders respectively, each individual piston defining in the corresponding individual cylinder a front pressure primary individual chamber and a rear space, said rear space communicating with said general chamber, abutment means disposed between said piston means and each of said individual pistons for transmitting parallel movements to said individual pistons from said piston means when said piston means is displaced by actuation of said pedal, a reservoir, means providing communication between said reservoir and said general chamber, means defining passageways between said primary chambers and said general chamber, valve means in said passageways, said valve means being operatively connected with said abutment means and operable to an open position when said piston means is at rest and said abutment means inoperative and in a closed condition when said piston means is actuated rendering said abutment means operative, two primary conduits operatively connecting the said two primary chambers with the two brakes respectively, each brake having a primary member responsive to a primary actuating hydraulic pressure in said primary chamber and said primary conduit connected to said brake and a secondary member sensitive to a braking reaction when said primary pressure is applied, balancing means operatively coupling the secondary members of the two brakes and equalizing the said reactions thereon, whereby when said piston means is displaced upon actuation of said pedal the two said individual pistons effect equal strokes while the two primary pressures are made independent from each other and can accommodate the equalization of said reactions by said balancing means on said secondary members, said balancing means comprising two secondary conduits operatively connected with the two brakes respectively, said secondary conduits being permanently connected to each other, further said master cylinder having an intermediate space defined on the rear side of said piston means, said intermediate space extending between two piston elements of said piston means, said piston elements being reciprocable with respect to each other, a recharging conduit connecting said secondary conduits with said intermediate space, valve means in said recharging conduit actuated by said piston means, a secondary reservoir, valve means between said secondary reservoir and said intermediate space and actuated by said piston means, and second valve means in said passageways for closing communication between said passageways, said second valve means having a plunger means adjacent to said intermediate space so that said second valve means close said communication between said passageways when pressure in said intermediate space is greater than a predetermined value and open said communication for equalizing the primary pressures when said pressure is smaller than said predetermined value.

7. A vehicle brake-operating system for a vehicle having a brake pedal comprising at least two brakes for two wheels of an axle of a vehicle respectively, a master-cylinder, a slidable piston means in said master-cylinder actuated by said brake pedal, a general pressure chamber disposed forward said piston means, two individual cylinders in said master cylinder adjacent to said general chamber, two individual pistons reciprocable in said individual cylinders respectively, each individual piston defining in the corresponding individual cylinder a front pressure primary individual chamber and a rear space, said rear space communicating with said general chamber, abutment means disposed between said piston means and each of said individual pistons for transmitting parallel movements to said individual pistons from said piston means when said piston means is displaced by actuation of said pedal, a reservoir, means providing communication between said reservoir and said general chamber, means defining passageways between said primary chambers and said general chamber, valve means in said passageways, said valve means being operatively connected with said abutment means and operable to an open position when said piston means is at rest and said abutment means inoperative and in a closed condition when said piston means is actuated rendering said abutment means operative, two primary conduits operatively connecting the said two primary chambers with the two brakes respectively, each brake having a primary member responsive to a primary actuating hydraulic pressure in said primary chamber and said primary conduit connected to said brake and a secondary member sensitive to a braking reaction when said primary pressure is applied, balancing means operatively coupling the secondary members of the two brakes and equalizing the said reactions thereon, whereby when said piston means is displaced upon actuation of said pedal the two said individual pistons effect equal strokes while the two primary pressures are made independent from each other and can accommodate the equalization of said reactions by said balancing means on said secondary members, said balancing means comprising two secondary conduits operatively connected with the two brakes respectively, said secondary conduits being permanently connected to each other, further comprising a recharging passageway in each brake between the primary conduit and the secondary conduit thereof, and valve means in said passageway responsive to the pressure of said secondary conduit so that the said valve means close said passageway when said pressure is greater than a predetermined value and open said passageway when said pressure is smaller than said value.

8. A vehicle brake-operating system for a vehicle having a brake pedal comprising at least two brakes for two wheels of an axle of a vehicle respectively, a master-cylinder, a slidable piston means in said master-cylinder actuated by said brake pedal, a general pressure chamber disposed forward said piston means, two individual cylinders in said master cylinder adjacent to said general chamber, two individual pistons reciprocable in said individual cylinders respectively, each individual piston defining in the corresponding individual cylinder a front pressure primary individual chamber and a rear space, said rear space communicating with said general chamber, abutment means disposed between said piston means and each of said individual pistons for transmitting parallel movements to said individual pistons from said piston means when said piston means is displaced by actuation of said pedal, a reservoir, means providing communication between said reservoir and said general chamber, means defining passageways between said primary chambers and said general chamber, valve means in said passageways, said valve means being operatively connected with said abutment means and operable to an open position when said piston means is at rest and said abutment means inoperative and in a closed condition when said piston means is actuated rendering said abutment means operative, two primary conduits operatively connecting the said two primary chambers with the two brakes respectively, each brake having a primary member responsive to a primary actuating hydraulic pressure in said primary chamber and said primary conduit connected to said brake and a secondary member sensitive to a braking reaction when said primary pressure is applied, balancing means operatively coupling the secondary members of the two brakes and equalizing the said reactions thereon, whereby when said piston means is displaced upon actuation of said pedal the two said individual pistons effect equal strokes while the two primary pressures are made independent from each other and can accommodate the equalization of said reactions by said balancing means on said secondary members, said balancing means comprising two secondary conduits operatively connected with the two brakes respectively, said secondary conduits being permanently connected to each other, each brake comprising a drum, two shoes adapted to frictionally engage said drum, a primary cylinder connected with the corresponding primary conduit, a primary piston in said primary cylinder connected with one of said shoes, a secondary cylinder connected with the secondary conduit, a secondary piston in said secondary cylinder connected to the other of said shoes, a rod operatively engaged between said pistons for imposing a lower limit to the distance apart of the two pistons, spring loaded abutment means for said rod for defining a fluid reserve in said secondary cylinder, and spring means to restore said shoes in a released position.

References Cited in the file of this patent

UNITED STATES PATENTS

| | | |
|---|---|---|
| 1,606,224 | Hoeller | Nov. 9, 1926 |
| 1,630,178 | Harrington | May 24, 1927 |
| 2,152,345 | Bowen | Mar. 28, 1939 |
| 2,201,086 | Guderian | May 14, 1940 |
| 2,385,812 | Hoyt | Oct. 2, 1945 |
| 2,494,319 | Swan | Jan. 10, 1950 |